United States Patent
Vazquez Orpinel et al.

(10) Patent No.: US 10,099,540 B2
(45) Date of Patent: Oct. 16, 2018

(54) MOTOR VEHICLE DOOR WITH HIDDEN KEY CYLINDER

(71) Applicant: FORD GLOBAL TECHNOLOGIES, LLC, Dearborn, MI (US)

(72) Inventors: Paulina Vazquez Orpinel, Mexico City (MX); Jeffrey Scott Mayville, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 73 days.

(21) Appl. No.: 14/961,533

(22) Filed: Dec. 7, 2015

(65) Prior Publication Data

US 2017/0158033 A1   Jun. 8, 2017

(51) Int. Cl.
*B60J 5/00* (2006.01)
*B60R 13/00* (2006.01)
*E05F 1/10* (2006.01)
*E06B 3/82* (2006.01)

(52) U.S. Cl.
CPC ............. *B60J 5/00* (2013.01); *B60R 13/005* (2013.01); *E05F 1/10* (2013.01); *E06B 3/82* (2013.01); *E05Y 2900/50* (2013.01)

(58) Field of Classification Search
CPC ........ E05B 85/16; E05B 17/183; E05B 65/10; E05B 81/16; E05B 88/36; E05B 85/103; E05B 85/107; Y10T 292/57; Y10T 70/7955; Y10T 70/8649; Y10T 70/5761; Y10T 70/577; Y10T 70/5978; Y10T 70/7051
USPC ........ 296/152; 292/336.3; 70/423, 455, 208, 70/210, 257, 275, 428
See application file for complete search history.

(56) References Cited

U.S. PATENT DOCUMENTS

| | | | |
|---|---|---|---|
| 7,526,936 B2 | 5/2009 | Niskanen et al. | |
| 8,146,393 B2 * | 4/2012 | Katagiri | E05B 17/18 292/336.3 |
| 8,904,835 B2 | 12/2014 | Boehm et al. | |
| 2004/0177478 A1 * | 9/2004 | Louvel | E05B 81/78 16/430 |
| 2012/0205925 A1 * | 8/2012 | Muller | E05B 77/04 292/336.3 |

(Continued)

FOREIGN PATENT DOCUMENTS

DE   19724573 C2   5/2002
DE   102008000190 A1   8/2009

(Continued)

OTHER PUBLICATIONS

English machine translation of DE102008000190A1.

(Continued)

*Primary Examiner* — Darrell G Dayoan
*Assistant Examiner* — Sunsurraye Westbrook
(74) *Attorney, Agent, or Firm* — Jason Rogers; King & Schickli, PLLC

(57) ABSTRACT

A motor vehicle door is provided. That door includes a door body that carries a door handle and a decorative trim feature remote from the door handle. A key cylinder is carried on the door body behind an access door in the decorative trim feature. The positioning of a hidden key cylinder at a position remote from the door handle frees designers to provide a motor vehicle door with a cleaner and more aesthetically appealing appearance.

14 Claims, 4 Drawing Sheets

(56) References Cited

U.S. PATENT DOCUMENTS

| | | | |
|---|---|---|---|
| 2013/0098123 A1* | 4/2013 | Gorontzi | E05B 1/0092 |
| | | | 70/201 |
| 2014/0096576 A1* | 4/2014 | Zimmer | E05B 85/10 |
| | | | 70/101 |
| 2014/0125071 A1 | 5/2014 | McWilliams | |
| 2014/0259952 A1* | 9/2014 | Sheehy | B60J 5/0418 |
| | | | 49/475.1 |
| 2015/0259953 A1* | 9/2015 | Linden | E05B 85/06 |
| | | | 70/91 |

FOREIGN PATENT DOCUMENTS

| | | |
|---|---|---|
| EP | 1079049 B1 | 1/2004 |
| FR | 2819539 A1 | 7/2002 |

OTHER PUBLICATIONS

English machine translation of DE19724573C2.
English machine translation of EP1079049B1.
English machine translation of FR2819539A1.

\* cited by examiner

MOTOR VEHICLE DOOR WITH HIDDEN KEY CYLINDER

TECHNICAL FIELD

This document relates generally to the motor vehicle equipment field and, more particularly, to a door for a motor vehicle including a key cylinder that is hidden behind a decorative trim feature carried on the body of the door at a location remote from the door handle.

BACKGROUND

This document relates to a new and improved door for a motor vehicle. Such a door is characterized by enhanced craftsmanship and design quality resulting in a clean door outer panel wherein the key cylinder is provided within a decorative trim feature at a position on the door remote from the door handle.

SUMMARY

In accordance with the purposes and benefits described herein, a door is provided for a motor vehicle. That door comprises a door body and a door handle carried on the door body. Further, the door includes a decorative trim feature carried on the door body that is remote from the door handle. A key cylinder is carried on the door body behind the decorative trim feature.

The decorative trim feature may be a badge and may include the make or model of the motor vehicle.

In some embodiments the door may also include a belt molding that is carried on the door body. The door handle may be carried on the belt molding.

In some embodiments, the door body may include a leading edge or hinge edge and the decorative trim feature may be carried on the door body adjacent that leading or hinge edge. In some embodiments, the decorative trim feature is carried below the belt molding on the door body.

In some embodiments, the decorative trim feature includes an access door that overlies the key cylinder. In some embodiments, that access door is pivotally connected to a remainder of the decorative trim feature. That access door may be square in profile. Further that access door may include rounded corners.

In some embodiments, the access door is inward opening. Such an access door may include a projecting stop while the remainder of the decorative trim feature includes a recess for receiving and holding that stop when the access door is in a closed position flush with the face of the remainder of the decorative trim feature.

In some embodiments, the access door may include a spring that biases the access door to a closed position overlying the key cylinder.

In the following description, there are shown and described several preferred embodiments of the motor vehicle door. As it should be realized, the motor vehicle door is capable of other, different embodiments and its several details are capable of modification in various, obvious aspects all without departing from the door as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the motor vehicle door and together with the description serve to explain certain principles thereof. In the drawing figures.

Reference will now be made in detail to the present preferred embodiments of the motor vehicle door, examples of which are illustrated in the accompanying drawing figures.

DETAILED DESCRIPTION

Figure 1:
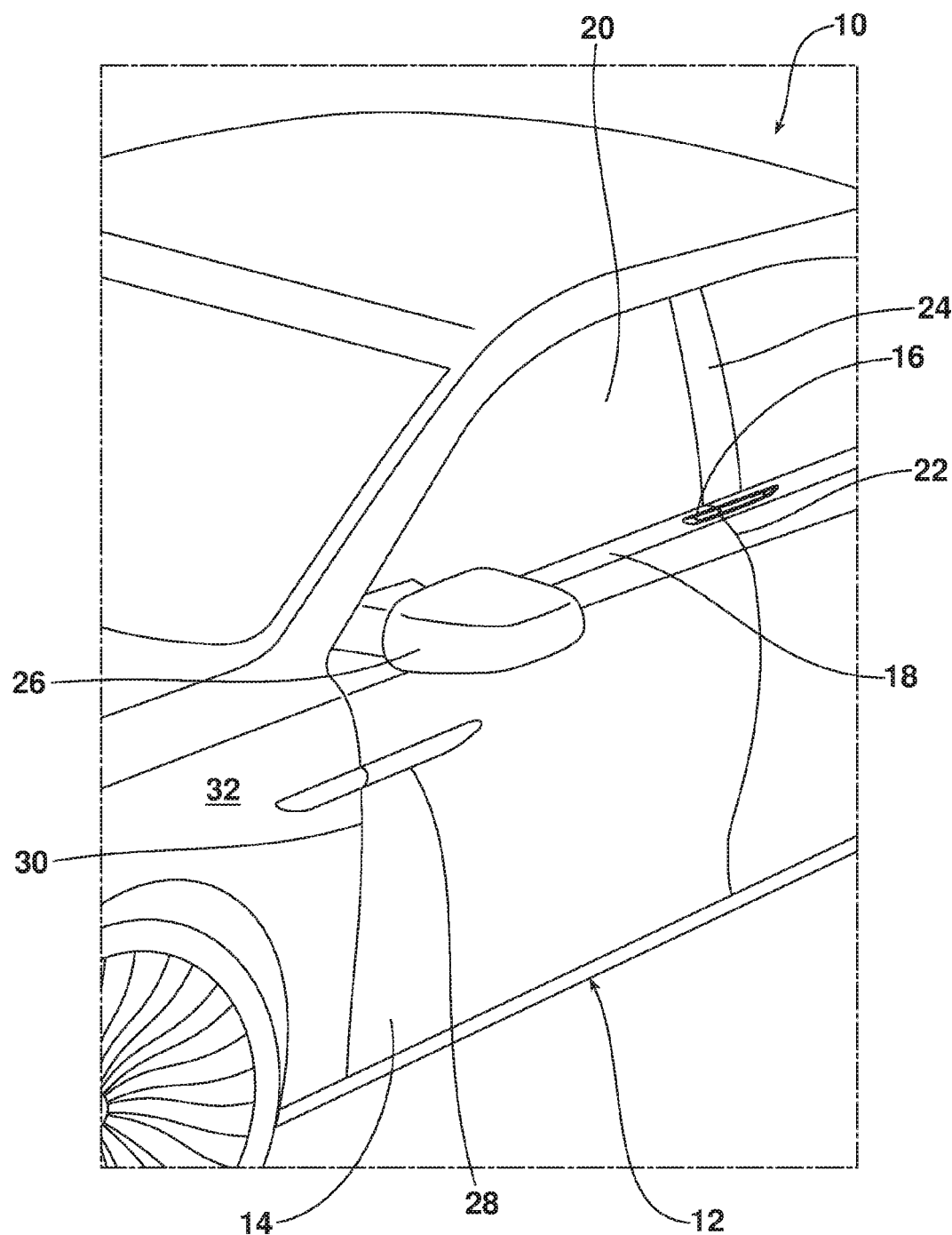
FIG. 1 is a perspective view of a motor vehicle including a door constructed in accordance with the teachings of this document.

Reference is now made to FIG. 1 illustrating a motor vehicle 10 equipped with a motor vehicle door 12 constructed in accordance with the teachings of this document. While a driver's side door 12 is illustrated, it should be appreciated that substantially any other door or closure of the motor vehicle 10 may include the features being described in this document. As illustrated, the door 12 includes a body 14 which includes an outer panel made from sheet metal, aluminum, fiberglass or other appropriate material.

In the illustrated embodiment, the body 14 carries a door handle 16 for opening and closing the door 12. In addition, the body 14 carries a belt molding 18 at the belt line of the motor vehicle 10 immediately below the door window 20. In the illustrated embodiment, the door handle 16 is provided in the belt molding 18 adjacent the rear edge 22 of the door 12 and the B pillar 24 of the motor vehicle 10.

As also illustrated in FIG. 1, the door 12 carries a rear view mirror assembly 26 and a decorative trim feature 28. As illustrated in FIG. 1, the decorative trim feature 28 is carried on the door body 14 at a position or location remote from the door handle 16. In the illustrated embodiment, the decorative trim feature 28 is carried adjacent a leading or front edge 30 of the door body 14 which is at the hinge side of the door opposite the door handle 16. In the illustrated embodiment, the decorative trim feature 28 is carried on the door body 14 below the belt molding 18 which holds the door handle 16. Further, as illustrated in FIG. 1, it should be appreciated that the trim feature 28 may extend forward past the door body 14 along the front fender 32 if desired.

Figure 2:
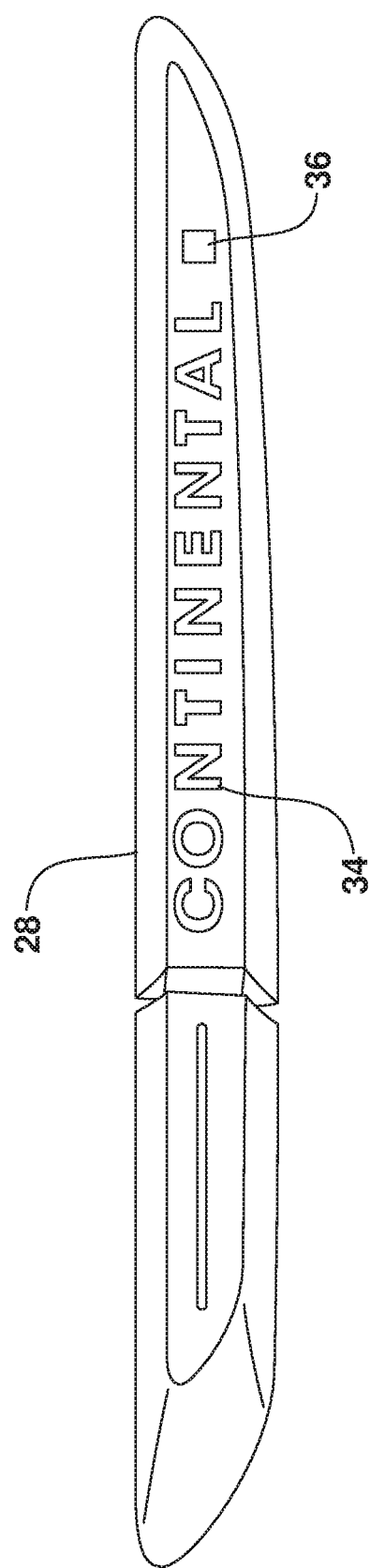
FIG. 2 is a detailed elevational view of one possible decorative trim feature provided on that door.

As illustrated in detail in FIG. 2, the decorative trim feature 28 may comprise a badge incorporating indicia 34 indicating the make or model of the motor vehicle 10.

Figure 3:
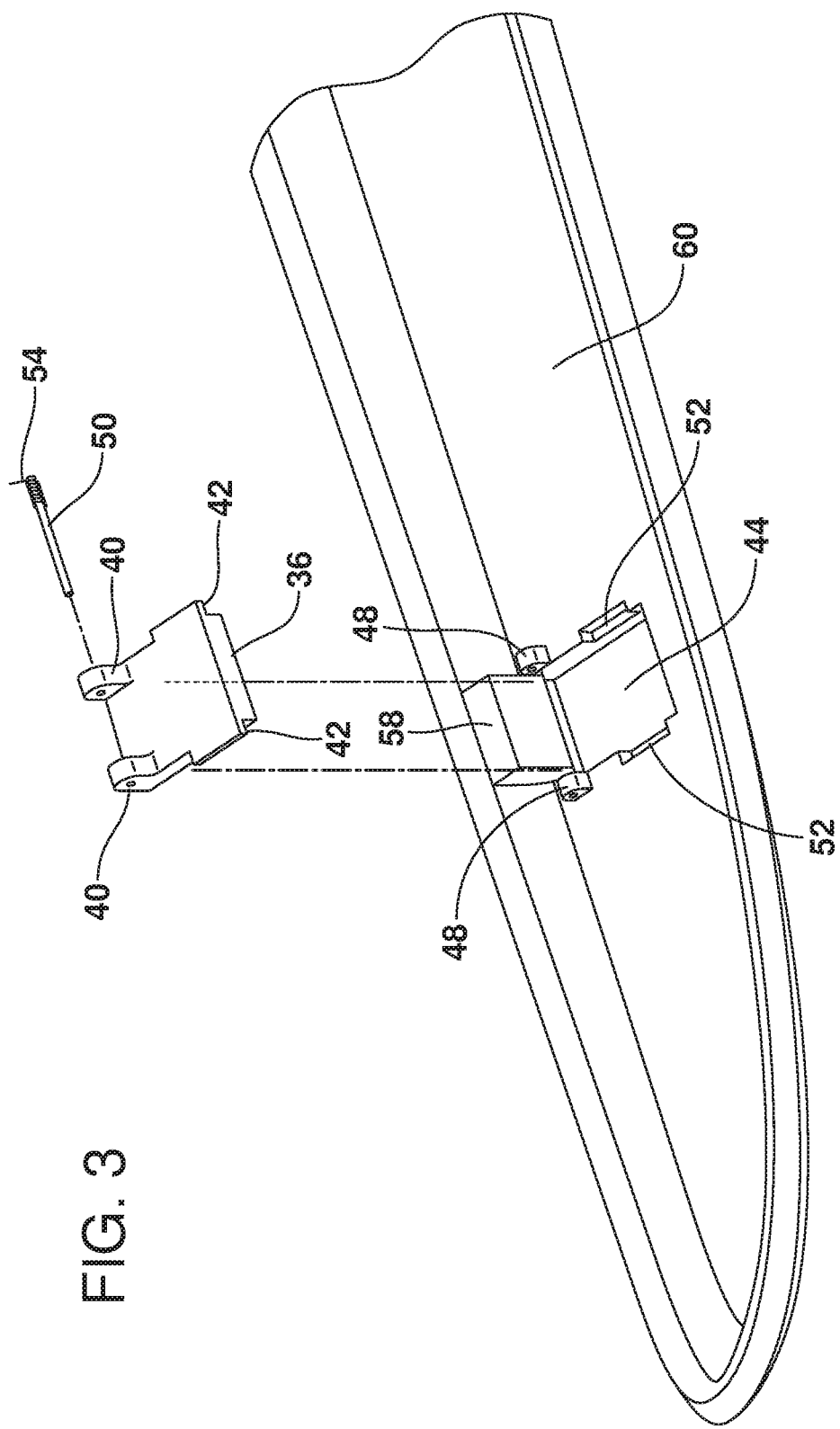
FIG. 3 is a fragmentary and exploded perspective view of the decorative trim feature including a pivoting access door.
Figure 4:
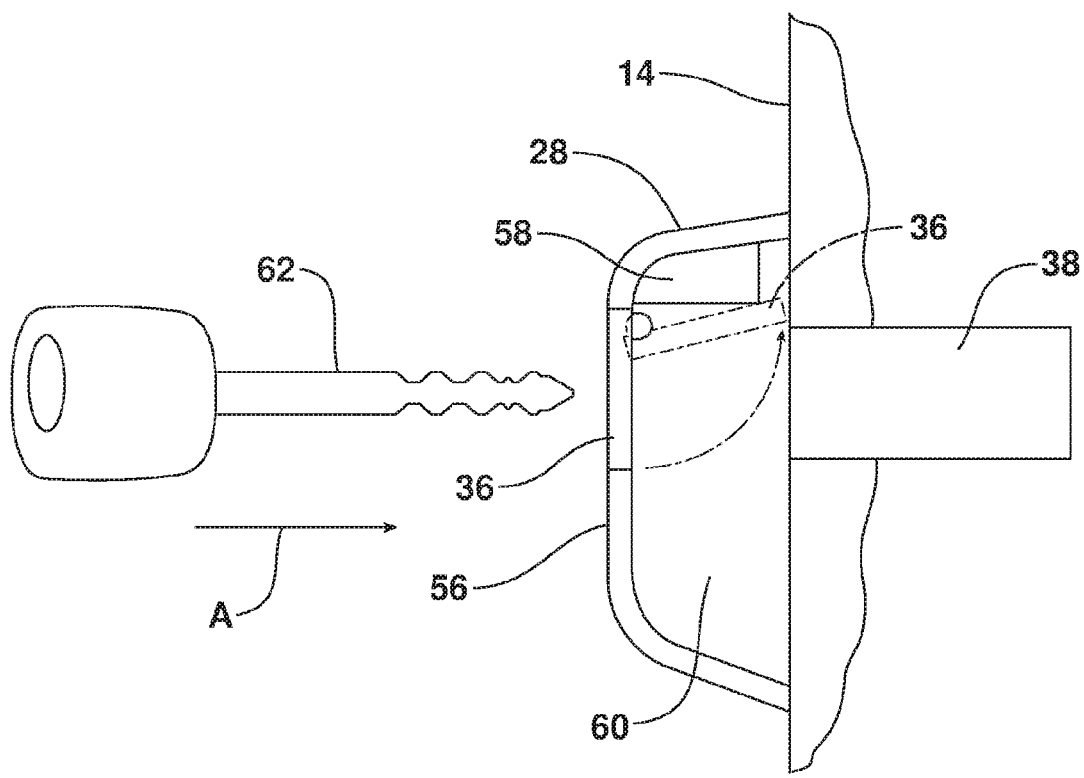
FIG. 4 is a schematic cross-sectional view illustrating the access door in full line in a closed position concealing a key cylinder and in phantom line in an open position allowing access to the key cylinder.

As illustrated in FIGS. 2, 3 and 4, the decorative trim feature 28 may also include an access door 36 that overlies a key cylinder 38 that is carried on the door body 14 behind the decorative trim feature 28. In the illustrated embodiment, the access door 36 has a square profile with rounded corners. It should be appreciated, however, that the access door 36 may assume profiles of other shapes including but not limited to various polygonal configurations that may even blend into or form part of the indicia 34 if desired.

As best illustrated in FIG. 3, the access door 36 includes two lugs 40 and two opposed projecting stops 42. The remainder of the decorative trim feature 28 includes an opening 44. The rear of the decorative trim feature 28 includes two opposed pivot ears 48. A pivot pin 50 extends through the pivot ears 48 and the lugs 40 to pivotally connect the access door 36 to the remainder of the decorative trim feature 28. Recesses 52 provided adjacent the opening 44 in the rear wall of the decorative trim feature 28 receive and hold the stops 42 on the access door 36 when the access door is in a closed position. A spring 54, such a torsion spring, may be provided at the pivot pin 50 to bias the access door 36 into a closed position wherein the stops 42 engage the bottom of the recesses 52 and hold the front of the access door 36 flush with the face 56 of the decorative trim feature 28 (see also FIG. 4). An additional stop 58 formed at the rear of the decorative trim feature 28 above the opening 44 engages the rear of the access door when opened in order to establish the fully open position allowing access to the key cylinder 38. Here it should be appreciated that the decorative trim feature 28 is shaped to provide a cavity 60 of sufficient depth between the decorative trim feature 28 and the key cylinder 38 carried on the door body 14 to allow full pivoting movement of the access door 36 between the open and closed positions.

As should be appreciated, the access door 36 is opened to gain access to the key cylinder 38 by engaging the front of the access door 36 with the end of the key 62 and pushing inward in the direction of action arrow A in FIG. 4 until the access door 36 pivots fully open and the key 62 engages in the key cylinder 38 allowing one to turn the lock.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A door for a motor vehicle, comprising:
    a door body;
    a door handle carried on said door body;
    a decorative trim feature carried on said door body remote from said door handle;
    a key cylinder carried on said door body behind said decorative trim feature; and
    an access door overlying said key cylinder, wherein said access door is pivotally connected to a remainder of said decorative trim feature.

2. The door of claim 1, wherein said decorative trim feature is a badge.

3. The door of claim 1, further including a belt molding carried on said door body.

4. The door of claim 3, wherein said door handle is carried on said belt molding.

5. The door of claim 4, wherein said door body includes a leading edge and said decorative trim feature is carried on said door body adjacent said leading edge.

6. The door of claim 5, wherein said decorative trim feature is carried below said belt molding on said door body.

7. The door of claim 6, wherein said access door has a square profile.

8. The door of claim 7, wherein said access door includes rounded corners.

9. The door of claim 7, wherein said access door includes a projecting stop and said remainder of said decorative trim feature includes a recess for receiving and holding said stop when said access door is in a closed position flush with a face of said remainder.

10. The door of claim 9, wherein said access door includes a spring that biases said access door into a closed position overlying said key cylinder.

11. The door of claim 6, wherein said access door is inward opening.

12. The door of claim 6, wherein said access door includes a projecting stop and said remainder of said decorative trim feature includes a recess for receiving and holding said stop when said access door is in a closed position flush with a face of said remainder.

13. The door of claim 12, wherein said access door includes a spring that biases said access door into a closed position overlying said key cylinder.

14. The door of claim 6, wherein said access door includes a spring that biases said access door into a closed position overlying said key cylinder.

* * * * *